United States Patent [19]

Conner

[11] 4,428,604
[45] Jan. 31, 1984

[54] RESTRAINED PIPE JOINT AND ASSOCIATED SNAP-RING

[75] Inventor: Randall C. Conner, Birmingham, Ala.

[73] Assignee: American Cast Iron Pipe Company, Birmingham, Ala.

[21] Appl. No.: 242,925

[22] Filed: Mar. 12, 1981

[51] Int. Cl.³ .............................................. F16L 21/08
[52] U.S. Cl. ..................................... 285/321; 285/374
[58] Field of Search ................ 285/374, 321, 310, 309

[56] References Cited

U.S. PATENT DOCUMENTS

| | | |
|---|---|---|
| 1,873,621 | 8/1932 | Moore . |
| 2,009,650 | 7/1935 | Claussen et al. . |
| 2,097,628 | 11/1937 | Liebhardt . |
| 2,774,617 | 12/1956 | Lanninger . |
| 2,806,717 | 9/1957 | Hempel . |
| 2,877,732 | 3/1959 | Eaton .............................. 285/321 X |
| 2,883,083 | 4/1959 | Terry, Jr. et al. .............. 285/309 X |
| 2,991,092 | 7/1961 | MacKay . |
| 3,177,019 | 4/1965 | Osweiler . |
| 3,219,364 | 11/1965 | Wooldridge . |
| 3,381,983 | 5/1968 | Hanes . |
| 3,521,911 | 7/1970 | Hanes et al. . |
| 3,684,320 | 8/1972 | Platzer et al. . |
| 3,698,744 | 10/1972 | Bevington . |
| 3,776,576 | 12/1973 | Keyser ............................ 285/321 X |
| 3,884,510 | 5/1975 | Bram .............................. 285/374 X |
| 4,296,953 | 10/1981 | Nagao et al. ................... 285/374 X |

FOREIGN PATENT DOCUMENTS

| | | | |
|---|---|---|---|
| 948463 | 8/1956 | Fed. Rep. of Germany . | |
| 54-106916 | 8/1979 | Japan ................................... | 285/374 |
| 54-106917 | 8/1979 | Japan ................................... | 285/374 |
| 54-106918 | 8/1979 | Japan ................................... | 285/374 |
| 632049 | 11/1949 | United Kingdom ................ | 285/321 |
| 1077599 | 8/1967 | United Kingdom ................ | 285/321 |

Primary Examiner—Thomas F. Callaghan
Attorney, Agent, or Firm—Kerkam, Stowell, Kondracki & Clarke

[57] ABSTRACT

A pipe joint is locked against separation by a split snap-ring assembly including a ring adjustor outside of the plane of the snap-ring. The snap-ring assembly is especially well suited for use with spigot and socket joints of large diameter pipe.

15 Claims, 7 Drawing Figures

RESTRAINED PIPE JOINT AND ASSOCIATED SNAP-RING

FIELD OF THE INVENTION

The present invention relates to restrained pipe joints and, more specifically, to a pipe joint including a snap ring which prevents axial movement of the bell end of one pipe relative to the spigot end of an attached pipe.

DESCRIPTION OF THE PRIOR ART

The use of pipe joints, couplings and fittings of the socket and spigot type is well known in the art and is shown, in U.S. Pat. No. 2,991,092, issued to Jack W. MacKay on July 4, 1961. The aforementioned MacKay patent, which is assigned to the assignee of the present invention and hereby incorporated by reference, discloses the use of a double sealing gasket for socket and spigot type joints. The simplicity and tightness of the seal in the joint disclosed in the MacKay patent makes this joint useful for a wide variety of applications. As is well known in the art, many such joints are continually subject in use to axial forces which tend to move one pipe away from the adjacent and connecting pipe.

Numerous attempts have been made in the prior art to construct pipe joints designed to withstand axial forces. Such pipe joints are often complex in construction and may require extensive modification of the basic socket and spigot ends of the connecting pipes. Often these prior art pipe joints require some form of bolt arrangement designed to clamp one pipe to the adjacent pipe. Such bolt type of pipe joints are generally ill suited for providing angular deflection after assembly between the spigot end of the pipe and the attached socket or bell end of the pipe. It should be noted that it is generally desirable for a pipe joint to accomodate limited angular deflection or pivoting movement between the spigot end of the pipe and the attached socket end of the pipe making up a particular pipe joint.

Another form of restrained pipe joint known in the prior art provides the spigot end of the pipe with a locking collar welded or otherwise attached to it. In such an arrangement, the bell member of the socket pipe is inserted between the locking collar and the spigot end of the pipe itself, whereupon the locking collar is rotated to an angular position relative to the bell member and locked therein such that the bell member may not be axially displaced relative to the locking collar and spigot. The rotation feature may be disadvantageous in certain respects. For example, the tolerance of the socket or bell member must be tightly controlled. If the bell member is too large it may prevent rotation and locking or it may bind on the locking collar of the spigot section making rotation of the locking collar extremely difficult. Alternatively, if the bell member is too small, it will not prevent back rotation of the locking collar, raising the possibility that the repeated application of fluid through the pipe may cause the locked joint to be undone. This structure is usually complex and is less than desirable in strength and cost.

Another form of known restrained pipe joints employs a snap-ring to secure the spigot and socket against separation. Snap-rings have generally required substantial modification to the basic spigot and socket interface, and usually need a slot or window in the socket pipe for allowing adjustment to the snap-ring diameter to lock or unlock the joint. Accessability to the snap-ring becomes a serious problem. In addition, if the gasket is carried by the spigot member and the snap-ring is carried by the bell member, as is the case in the prior art, the gasket must pass by the snap-ring member during installation. The gasket is thus susceptable and clearly vulnerable to damage in installation.

Accordingly, whereas the prior art has developed numerous techniques for axially restraining pipe joints from separation due to axial forces, the techniques are subject to several disadvantages.

It is therefore an object of the present invention to provide an improved pipe joint locked against separation.

A further object of the present invention is to provide an improved pipe joint allowing for a limited angular displacement between adjacent pipes.

A still further object of the present invention is to provide an improved pipe joint which will permit rotation of the socket or bell end pipe relative to the spigot end pipe without causing unlocking of the joint.

Yet another object of the present invention is to provide an improved axially restrained pipe joint wherein the bell end of the pipe is not angularly fixed to the spigot end of the pipe.

Another object of the present invention is to provide an improved snap-ring assembly and associated pipe joint wherein the socket end of a pipe accomodates an adjustable snap-ring assembly.

Yet another object of the present invention is to provide an improved restrained pipe joint having a snap-ring assembly readily accessible from outside the pipe joint.

Still another object of the present invention is to provide for a restrained pipe joint including a socket member with only continuous annular contours. This pipe joint may include a socket member with no holes, slots, windows, or other discontinuities. In addition, no internal or external locking lugs may be required in the locking collar or socket member.

SUMMARY OF THE INVENTION

The above and other objects of the present invention are accomplished by a pipe joint locked against axial separation for a readily accessible snap-ring assembly. The pipe joint comprises a cylindrical socket, a cylindrical spigot extending into said cylindrical socket and having an outwardly projecting portion fixed to that part of the cylindrical spigot which is within the cylindrical socket, and a gasket sealing joint between the cylindrical socket and the cylindrical spigot. The outwardly projecting portion is preferably a spigot ring welded to the spigot. A bearing snap-ring assembly locks the cylindrical socket against separation from the cylindrical spigot. The ring assembly includes a bearing snap-ring which bears between the cylindrical socket and the outwardly projecting portion fixed to the cylindrical spigot. The snap-ring is split to provide two ends from which extend two transverse pieces parallel to the axis of the joint. Each piece is attached to one of the two ends of the snap-ring and extends out of the plane uniquely defined by the snap-ring. The snap-ring assembly includes a ring adjuster located outside of the plane defined by the snap-ring and adapted to adjustably constrain the snap ring by adjusting its diameter. The ring adjuster preferably includes two lugs, each lug attached to a corresponding one of the two transverse pieces at an end opposite the bearing ring. A threaded stud extends between the two lugs and supports two spreader nuts and two closure nuts.

BRIEF DESCRIPTION OF THE DRAWINGS

These and other features of the present invention and the attendant advantages will be readily apparent to those having ordinary skill in the art and in the invention will be more easily understood from the following detailed description of the preferred embodiments of the present invention taken in conjunction with the accompanying drawings wherein like reference characters represent like parts throughout the several views.

DESCRIPTION OF THE PREFERRED EMBODIMENTS

Figure 1:
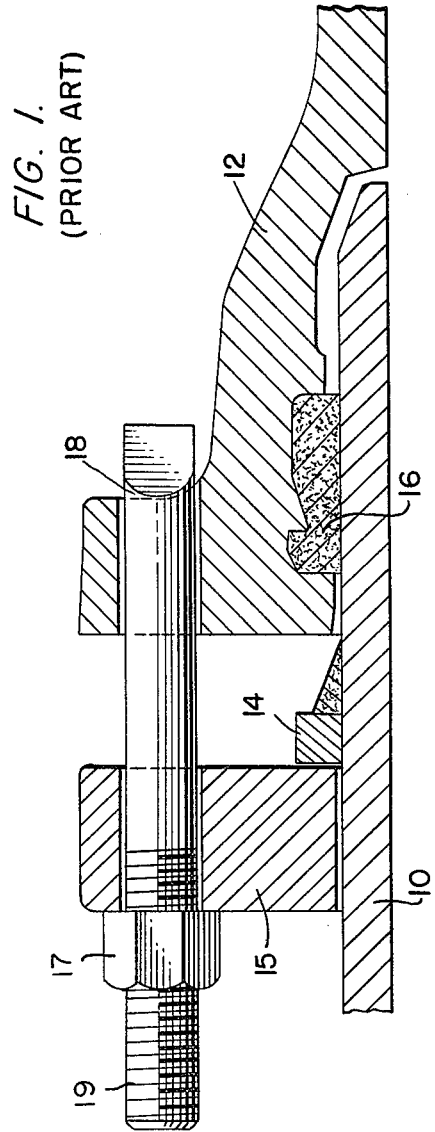
FIG. 1 and FIG. 2 represent cross-sectional views of prior art pipe joints.

Referring to the drawings, FIG. 1 shows in cross-section a particular type of an axially restrained pipe joint known in the prior art. The spigot end of pipe 10 is inserted within the bell end of pipe 12 with gasket 16 sealing the joint. Gasket 16 may be the double sealing action gasket of the aforenoted MacKay patent 2,991,092. A spigot ring 14 is welded or otherwise adhered to the spigot end pipe 10 as shown. Bell end 12 may include radially spaced through holes adapted to receive locking bolts which extend from a collar piece 15 so that the socket or bell end 12 is axially restrained by T head bolts 18.

Pressure is applied through nuts 17 which when threaded along threads 19 cause collar 15 and bell end 12 to be drawn toward each other, the position of collar 15 being limited by spigot ring 14.

Figure 2:
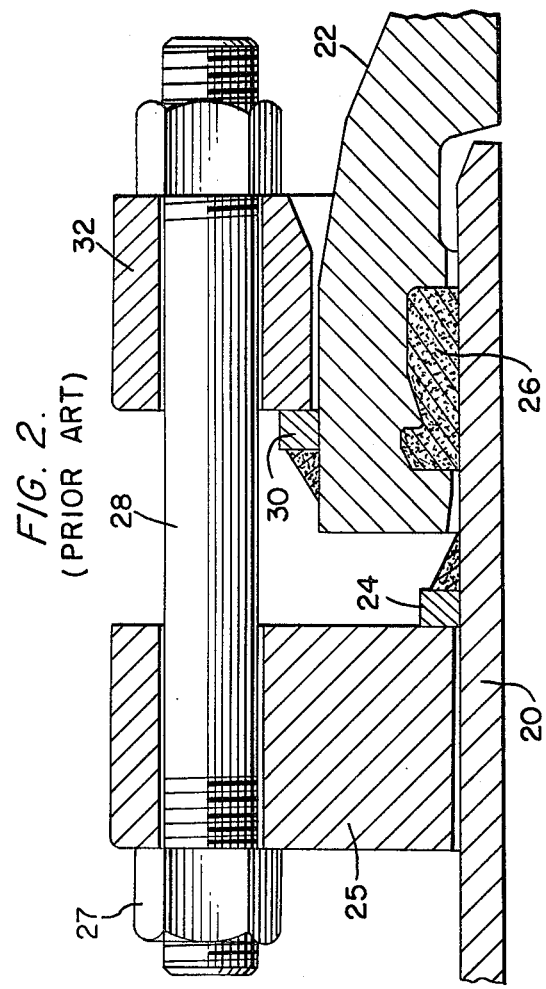

FIG. 2 shows a prior art arrangement similar to that of FIG. 1 except that the bell end of pipe 22 may rotate more freely relative to the spigot end of pipe 20. Those parts of the pipe joint of FIG. 2 which have corresponding parts in FIG. 1 are numbered by the FIG. 1 number plus 10. Collar piece 25 is caused to bear against spigot ring 24 by adjustment of nut 27 on stud 28 and a second nut threaded on the other end of the stud as shown. A bell or socket ring 30 is welded to the bell end of pipe 22 and bears against bell collar 32. Gasket 26 corresponds to the gasket 16 of FIG. 1. It should be noted that in the embodiment illustrated in FIG. 2, the collar 25 can rotate independently of the bell end pipe 22, whereas in the embodiment illustrated in FIG. 1, collar 15 is fixed in angle with respect to socket or bell end pipe 12.

Figure 3:
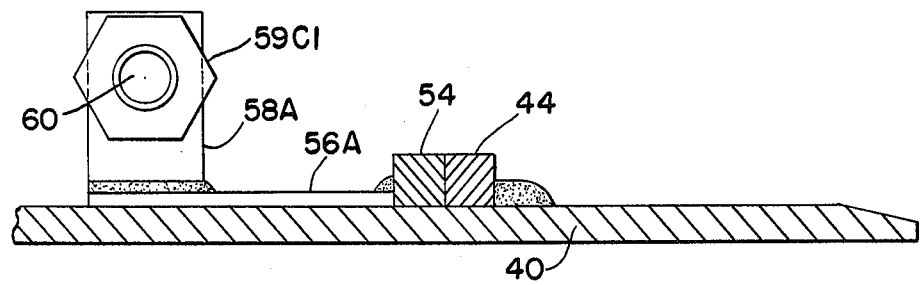
FIG. 3 is a cross-sectional fragmentary view of the spigot end of a pipe and a snap-ring in position ready for assembly into a bell end of a pipe to form a joint in accordance with the present invention.
Figure 4:
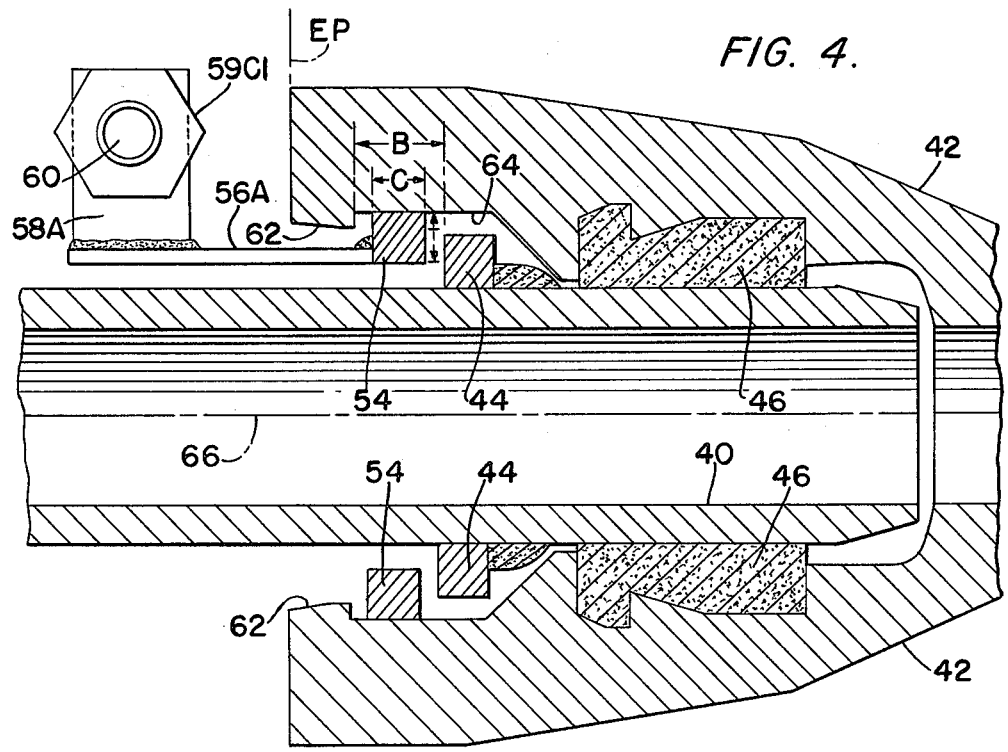
FIG. 4 is a cross-sectional fragmentary view of a joint according to the present invention.

FIGS. 3 and 4 illustrate a joint in accordance with the present invention. As shown in FIG. 3, a spigot 40 (representing the spigot end of a pipe) has welded or otherwise secured thereto a spigot ring 44, rectangular in cross-section, which preferably extends completely around the spigot 40. While the spigot ring 44 will usually extend circumferentially around the spigot 40, with its flat engaging surface positioned to lie flat against the spigot surface, in specific cases it may be desirable to have the spigot ring 40 positioned at an angle with respect to the circumference of spigot 40 as will be discussed below the reference to FIG. 6. As shown in FIG. 3, snap-ring 54 is positioned to extend in a circumference around spigot 40 adjacent to the spigot ring 44 as shown. Snap-ring 54 is split so that its natural resiliency causes the two ends to spread slightly, thus expanding the ring. Attached to each end of the split snap ring 54 is a transverse piece 56 which extends outwardly therefrom and which has affixed thereto by welding or the like an outwardly extending lug 58. Lug 58 is provided with a drilled hole through which is threaded stud 60. Attached to opposite ends of threaded stud 60 are closure nuts 59.

Figure 5:
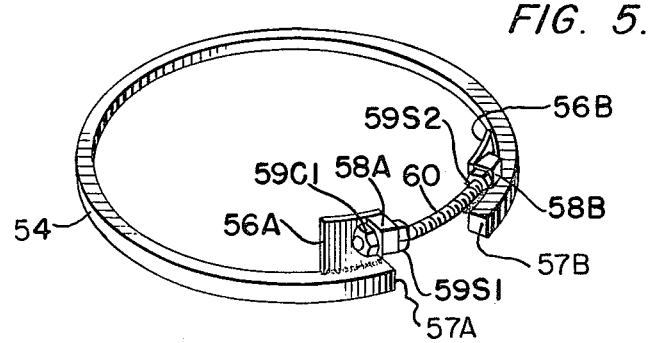
FIG. 5 is a perspective view of a snap-ring assembly of the present invention.

Turning momentarily to the perspective view of FIG. 5, the construction of the split snap-ring assembly will be more readily apparent. As shown, the snap ring assembly includes a square split ring 54 with two ends 57A and 57B formed at the split. Extending from each end 57A, and 57B substantially parallel to the axis of the joint to be restrained are corresponding transverse pieces 56A and 56B. Lugs 58A and 58B are welded respectively to transverse piece 56A and transverse piece 56B and extend outwardly therefrom. The threaded stud 60 is engaged in drilled holes in the lugs 58A and 58B and extends beyond the lugs to receive a closure nut 59C1 and 59C2 at each end. The two closure nuts 59C1 and 59C2 allow one to decrease the diameter of the snap ring 54. Threaded on stud 60 between lugs 58A and 58B are two spreader nuts 59S1 and 59S2. The two spreader nuts 59S1 and 59S2 allow one to increase the diameter of the snap-ring. Note that although FIG. 5 shows stud 60 as being curved, this is an alternate construction. In the preferred form stud 60 is straight as indicated by the absence of curved phantom lines in FIGS. 3 and 4.

Turning back to FIG. 3, it will be noted that the two closure nuts 59C1 and 59C2 have been adjusted such that snap-ring 54 is compressed, reducing its diameter slightly so that the inward flat surface of ring 54 contacts the outer surface of spigot 40 substantially around the entire circumference of spigot 40. In this position the bearing snap-ring assembly including its snap ring 54, transverse pieces 56A and 56B, lugs 58A and 58B, stud 60, nuts 59C1, 59C2, 59S1, and 59S2 are in the position for allowing the socket to be mounted to the spigot 40.

Referring to FIG. 4, the restrained pipe joint of the present invention is illustrated with the socket 42 being placed around spigot 40. To assemble the joint, socket 42 is slid onto the end of spigot 40. It will be readily understood that socket 42 may include a gasket 46 installed as disclosed in the aforenoted MacKay patent. It will further be understood that socket 42 may be one end of a pipe having a spigot at its other end, whereas the spigot 40 may include a socket at its end which is not shown. Only a fragmentary section is shown for simplicity. Typically the pipe may have a diameter in the order of 24 inches and a length of several feet.

After spigot 40 has been inserted into the cavity of socket 42 with its end passing beyond gasket 46 and its exterior surface in sealing engagement with gasket 46, the closure nuts 59C1 and 59C2 may be loosened such that snap ring 54 will expand radially outward from its position in FIG. 3 to that shown in FIG. 4. It may or may not be necessary to caulk the snap-ring into its final position in the assembled joint as shown in FIG. 4 after the closure nuts 59 are released to the ends of the stud 60. Further, spreader nuts 59S1 and 59S2 may be adjusted to push lugs 59A and 59B apart thereby increasing the diameter of split snap-ring 54 and insuring contact between snap ring 54 and a retaining groove 64 within the socket cavity and formed by the inside diameter of socket or bell 42. As shown in FIG. 4, the inner diameter surface of bearing ring 54 is separated (i.e., not in contact with) from other surfaces such as the surface of spigot 40. The end of socket 42 includes a radially inwardly projecting lip portion 62 which in combination with the radially outwardly projecting portion or spigot ring 44 of spigot 40 will prevent the socket 42 from separating from spigot 40. The retaining groove 64, lip portion 62, and associated portion of socket 42 act as a bearing ring retaining portion to retain bearing or snap ring 54. In particular, the application of an axial separating force to either socket 42 or spigot 40 will cause snap ring 54 to bear between and against the inside surface of inwardly projecting lip 62 and the vertical surface of outwardly projecting spigot ring 54. As shown, the lip portion 62 of socket 42 may be tapered or inclined slightly radially outward to facilitate the slipping of socket or bell 42 over the spigot ring 44 and snap ring 54.

The thickness T of snap ring 54 is the same as the thickness of spigot ring 44 as shown in FIG. 3 and is less than the difference between the smallest inner radius of the cylindrical socket at its lip portion and the outer radius of the cylindrical spigot 40. This relationship in the dimensions of the parts is necessary to allow socket 42 to freely slide onto spigot 40. Similarly, the smallest inner diameter of the cylindrical socket at its inwardly projecting lip portion must be greater than the outer diameter of the spigot ring.

Although the spreader nuts 59S1 and 59S2 may be used for insuring contact between the snap ring and the retaining groove 64, it is preferable if the natural outside diameter of the split snap ring is larger than the inside diameter of the retaining groove 64 in the cavity of the cylindrical socket. The natural outside diameter of the split snap ring 54 is defined as that outside diameter which the snap ring will assume when unconstrained by the ring adjuster comprising lugs 58A and 58B, stud 60, and nuts 59C1, 59C2, 59S1, and 59S2. By making the natural outside diameter of the snap ring larger than the inside diameter of the cylindrical socket 42 at its retaining groove 64, one insures that the stripping of the threads on stud 60 or the loss of stud 60 will not cause the snap ring 54 to slip out of its locking position. That is, snap ring 54 will maintain contact with the retaining groove 64 by virtue of its own resiliency.

The assembly of the present locked pipe joint may be summarized as follows:
1. The snap-ring assembly should be assembled snugly onto the spigot as shown in FIG. 3. A small hammer may be used to tap the ring substantially flush with the spigot ring prior to assembly.
2. Clean and lubricate spigot and socket surfaces as per normal assembly procedure. In addition to lubricating the bevel, sealing surface, and inside surface of the gasket, lubricate the exposed surfaces of the welded-on ring and snap-ring assembly as well.
3. Assemble the joint in essentially straight alignment as per normal procedure till the spigot contacts the rear of the socket. At this point, the spigot ring and snap-ring assembly should have disappeared inside the socket.
4. Loosen the outside nuts on the closure assembly to the end of the studs to allow the snap-ring to spread out against the inside of the socket. A caulking iron, chisel or other flat tool may be used at intervals around the joint till the ring obviously snaps into the ring retaining groove of the socket. This should be noticeable as an obvious spreading of the ring struts on the closure stud.
5. Make sure the snap-ring is correctly seated in the socket by visual observation and/or inspection with a feeler guage around the joint.
6. Tighten the inside nuts on the closure stud out firmly against the ring struts to insure intimate and positive contact of the snap-ring in the socket groove. Excessive torque on the inside nuts which might result in bending of the ring ends or closure assembly is not required.

In addition to axial separating forces parallel to center line 66, internal or external forces may deflect the axis or spigot 40 relative to the axis of socket 42. It is therefore necessary that the joint respond to these internal or external forces. For the present invention, the amount of deflection the joint can achieve in installation is approximately equal to the arctangent of the measure of movement the spigot may have in relation to the socket after the spigot is pushed as far as it will go into the socket in straight alignment and divided by the median diameter A of the assembled snap ring. The allowable deflection will be approximately as follows:

$$\text{Deflection} = \text{Arctan}((B-C)/A).$$

wherein B represents the distance shown between the edge of spigot ring 44 and the edge of separating lip 62 and A represents the median diameter of the snap ring 54 in its assembled (locked) position.

Figure 6:
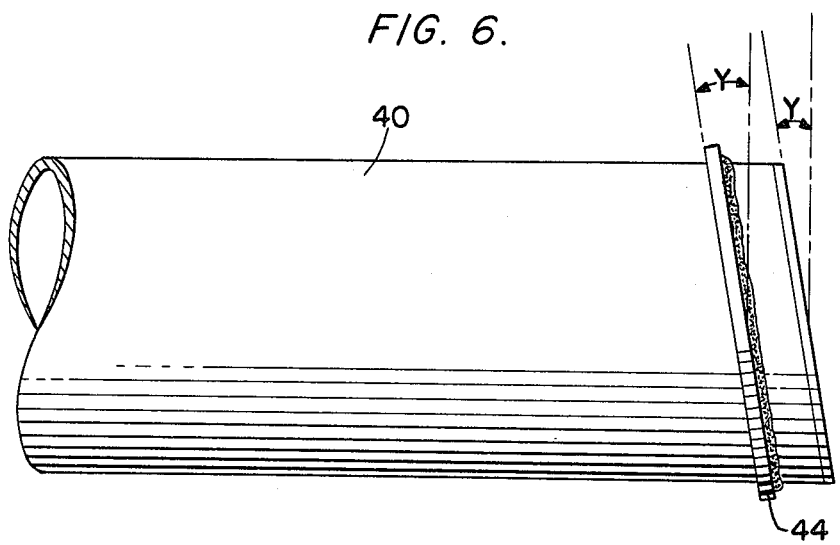
FIG. 6 is a fragmentary view of a spigot end of a pipe and spigot ring illustrating a modified embodiment of the present invention to furnish determinate joint deflection in the snap-ring joint.

Should more deflection be desired than is allowed by the above equation, a determinate amount of deflection might be achieved by welding the spigot ring onto the spigot at a prescribed angle Y to the spigot axis as shown in FIG. 6. Depending on the configuration of the rear of the gasket socket (not shown in FIG. 6), it may or may not be desirable to bevel the fitting end of spigot 40 to be parallel to the spigot ring 44.

Referring again to FIG. 4, a unique aspect in the relationship between the snap ring 54 and the ring adjuster comprising lugs 58A and 58B, stud 60, and nuts 59C1, 59C2, and 59S1 and 59S2, will be discussed. Snap ring 54 defines a ring plane of width C, which plane will be substantially perpendicular to center line 66. Additionally, socket 42 defines an end plane EP, which plane will also be substantially perpendicular to center line 66. Noting that anything to the right of the end plane EP as viewed in FIG. 4, may be considered as axially within the socket 42 and that anything to the left of end plane EP, as viewed in the drawing, is axially outside of socket 42, it will be readily appreciated that the ring adjuster comprising lugs 58A and 58B, stud 60, and nuts 59C1, 59C2, 59S1, and 59S2 is axially outside of socket 42. Additionally, it will be readily appreciated that the use of transverse pieces 56A and 56B makes this feature possible as well as allowing for the ring adjuster to be outside of the ring plane defined by the dimension C of snap ring 54. Note also that the socket 42 and spigot 40 have only continuous annular internal and external contours, the socket 42 and spigot 40 containing no bolt holes, lugs, slots, windows, holes, or other annular discontinuities.

Figure 7:
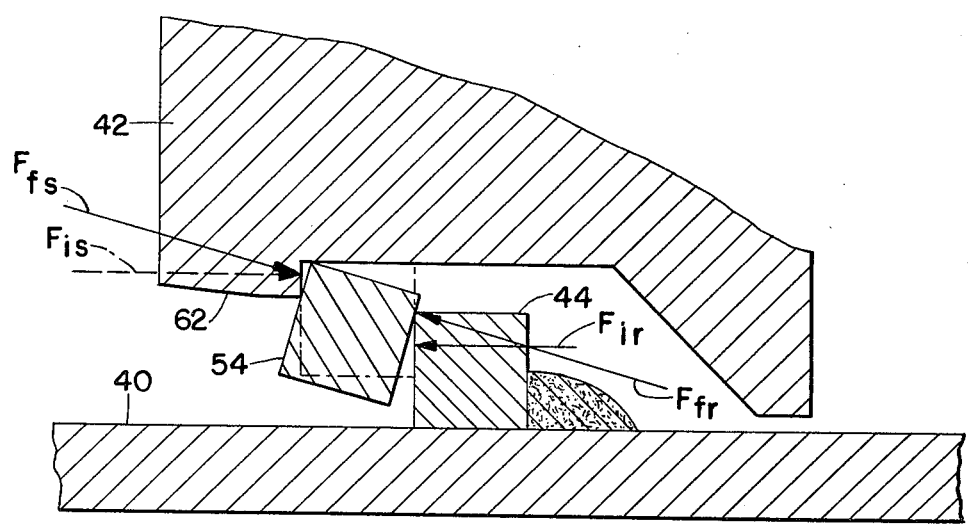
FIG. 7 is a cross-sectional fragmentary view of a joint illustrating the rotation of the snap-ring of the present invention in response to a joint separating force.

Turning now to FIG. 7, the response of the present inventive pipe joint to a great joint separating force will be discussed. Specifically, FIG. 7 shows in partial cross-section spigot 40, socket 42, spigot ring 44, and snap ring 54. Until initial application of axial separating forces, the snap ring, which is square in cross-section as shown, will assume the dotted position squarely in contact with the lip 62 and the spigot ring 44. The bearing ring has side surfaces (i.e., perpendicular to axis 66 in FIG. 4) bearing between surfaces of the spigot ring 44 and the lip 62. Because of the radial offset between the initial separating force $F_{is}$ and the initial retaining force $F_{ir}$, the application of additional external or internal axial separating forces will cause the square cross-section snap ring 54 to rotate slightly in response to the force couple created by this radial offset. As the snap ring 54 rotates, it wedges itself securely between the inwardly projecting lip portion 62 and the spigot ring 44. Consequently and as shown, a substantial radial component of force is realized, resulting in circumferential tensile stresses in the pipe socket and circumferential compressive stresses in the pipe spigot. Thus, the weld 44W used to attach the spigot ring 44 to the spigot is not subjected to direct shear, nor is the relatively shallow lip portion 62 of the pipe socket 42 subjected to direct shear. Instead of acting in direct shear, the stresses are transferred to the relatively more massive pipe spigot and socket sections. The strength of the joint is therefore increased. The ability of the relatively flexible square snap ring to rotate differing amounts responsive to force loads also allows this joint to maintain line contact with the socket 42 and the spigot ring 44 over much of its circumference when the pipe joint is held in a slightly deflected position by an external force (such as soil reaction) and subjected to the joint separating actions of internal or external forces.

The many advantages of the present invention over the prior art should be readily apparent. Specifically, the present invention provides for a great versatility and applicability in the layout and installation of pipes and ductile iron pipes lines. Furthermore, the present invention provides for a socket pipe joint having the advantage of simplicity of design and installation and high strength which allows stresses to be transferred to massive pipe sections rather than being applied directly to welds and lips. In particular and unlike much of the prior art, the assembly and disassembly of the present pipe joint will not require a lifting machine to handle and install the restraining component(s) of large diameter pipes and fittings. Further the cost of manufacturing and installation is quite low for the present invention, while additionally, being capable of withstanding larger separating forces.

Although the present invention pipe joint is useful with pipes of many different materials, the present pipe joint is especially well suited for use with ductile iron pipes. The snap ring assembly including the snap ring 54, transverse pieces 56A and 56B, lugs 58A and 58B, stud 60, and nuts 59C1, 59C2, 59S1 and 59S2 may preferably be made of a low alloy corrosion resistant steel.

The present invention is not limited to the exact structures shown, but is capable of a variety of mechanical embodiments. Various changes which would now suggest themselves to those skilled in the art may be made in the structural details of the present invention without departing from the inventive concept. Accordingly, the scope of the present invention should be determined by reference to the appended claims.

I claim:

1. A pipe joint restrained against axial separation comprising:

a cylindrical socket having only continuous annular internal and external contours;

a cylindrical spigot extending into said cylindrical socket and including a spigot ring fixed to that part of the cylindrical spigot which is within the cylindrical socket;

a gasket sealing the joint between the cylindrical socket and the cylindrical spigot;

a ring assembly having a first part positioned within said socket and a second part positioned outside of said socket, said first part including a bearing ring having two ends at a split, and said bearing ring being positioned between the socket and said spigot ring fixed to the said cylindrical spigot, said bearing ring uniquely defining a plane, two transverse pieces for connecting said first part to said second part, each said transverse piece being attached to one of the two ends of said bearing ring and extending away from the plane defined by said bearing ring to a position outside of said socket, said second part including a ring adjustor, said ring adjustor being located outside of said socket and adapted to adjustably constrain the bearing ring by allowing adjustment of the diameter of the bearing ring, said ring adjustor including a lug on each of said two transverse pieces, a threaded rod extending between the two lugs, a first spreader nut on said threaded rod, said first spreader nut operable to expand the diameter of said bearing ring, and a first closure nut on said threaded rod, said first closure nut operable to contract the diameter of said bearing ring; and wherein said cylindrical socket includes a radially inwardly projecting lip portion adjacent its end, and wherein said bearing ring is rectangular in cross-section and has side surfaces bearing between cooperating surfaces of the spigot ring and said inwardly projecting lip portion of said cylindrical socket and wherein the application of axial forces tending to separate said cylindrical socket from said cylindrical spigot causes the bearing ring to rotate and wedge itself securely between the inwardly projecting lip portion and the spigot ring.

2. The pipe joint of claim 1 wherein said bearing ring pushes radially outward into a retaining groove in said cylindrical socket adjacent said radially inwardly projecting lip portion and said bearing ring has an inner diameter surface which is separated from other surfaces.

3. The pipe joint of claim 2 wherein the smallest inner diameter of said cylindrical socket at said inwardly projecting lip portion is greater than the outer diameter of said spigot ring.

4. The pipe joint of claim 3 wherein said bearing ring is a snap-ring having a thickness less than the difference between the smallest inner radius of said cylindrical socket at said inwardly projecting lip portion and the outer radius of the cylindrical spigot.

5. The pipe joint of claim 4 wherein the natural outside diameter of said snap-ring when unconstrained by said ring adjustor is larger than the inside diameter of said cylindrical socket at its retaining groove.

6. The pipe joint of claim 1, 3, or 5 wherein said ring adjustor is axially outside of an end plane uniquely defined by the end of said cylindrical socket.

7. The pipe joint of claim 1, 3 or 5 wherein said cylindrical spigot has only continuous annular internal and external contours.

8. A pipe joint restrained against axial separation comprising:

a first pipe having a cylindrical socket;

a second pipe having a cylindrical spigot extending into said cylindrical socket and including an outwardly projecting portion;

a gasket sealing the joint between the cylindrical spigot and the cylindrical socket;

a bearing ring retaining portion;

a ring assembly having a first part positioned within said retaining portion and a second part positioned outside of said retaining portion, said first part including a bearing ring having two ends at a split and an inner diameter surface, said bearing ring being positioned between the retaining portion and one of said first and second pipes, said bearing ring uniquely defining a plane, two transverse pieces for connecting said first part to said second part, each said transverse piece being attached to one of the two ends of said bearing ring and extending away from the plane defined by said bearing ring to a position outside of said retaining portion;

said second part including a ring adjustor, said ring adjustor located outside of the plane defined by the bearing ring and being connected to each transverse piece and adapted to adjustably constrain the bearing ring by allowing adjustment of the diameter of the bearing ring, and wherein said retaining portion includes a radially inwardly projecting lip portion adjacent its end and a retaining groove, said bearing ring being disposed in said retaining groove to bear against said inwardly projecting lip portion to prevent axial separation of said first pipe from said second pipe and said ring adjustor being set to allow a maximum diameter for said bearing ring such that said bearing ring pushes radially outwardly into said retaining groove and the inner diameter surface of said bearing ring is separated from any other surfaces, and wherein said ring adjustor includes a threaded rod, a first spreader nut on said threaded rod, said first spreader nut being operable to expand the diameter of said bearing ring, and a first closure nut on said threaded rod, said first closure nut being operable to contract the diameter of said bearing ring, and said bearing ring is rectangular in cross-section and bears between cooperating surfaces of said outwardly projecting portion and said inwardly projecting lip portion of said cylindrical socket and wherein the application of axial forces tending to separate said cylindrical socket from said cylindrical spigot causes the bearing ring to rotate and wedge itself securely between the inwardly projecting lip portion and said outwardly projecting portion.

9. The pipe joint of claim 8 wherein said bearing ring is a snap ring, said retaining groove is annular, said snap ring has a natural outside diameter when constrained by said ring adjustor, and said natural outside diameter is larger than the inside diameter at said retaining groove.

10. The pipe joint of claim 9 wherein said cylindrical socket, said cylindrical spigot, and said retaining portion have continuous annular internal and external contours.

11. The pipe joint of claim 8 wherein said retaining portion is part of said socket, said spigot outwardly projecting portion is fixed to that part of said spigot which is within said socket, and said bearing ring bears between said retaining portion of said socket and said spigot outwardly projecting portion.

12. The pipe joint of claim 11 wherein said spigot outwardly projecting portion is a spigot ring fixed around said cylindrical spigot and the smallest inner diameter of said cylindrical socket at said inwardly projecting lip portion is greater than the outer diameter of said spigot ring.

13. The pipe joint of claim 12 wherein said bearing ring is a snap-ring having a thickness less than the difference between the smallest inner radius of said cylindrical socket at said inwardly projecting lip portion and the outer radius of the cylindrical spigot.

14. The pipe joint of claim 8 wherein said ring adjustor further includes a second spreader nut on said threaded rod, said second spreader nut being operable to expand the diameter of said bearing ring, and said ring adjustor further includes a second closure nut on said threaded rod, said second closure nut being operable to contract the diameter of said bearing ring.

15. The pipe joint of claim 14 further comprising a lug on each of said two transverse pieces and said threaded rod extends between the two lugs.

* * * * *